(12) United States Patent
Barriety

(10) Patent No.: US 6,827,314 B2
(45) Date of Patent: Dec. 7, 2004

(54) AIRCRAFT WITH ACTIVE CONTROL OF THE WARPING OF ITS WINGS

(75) Inventor: Bernard Barriety, Toulouse (FR)

(73) Assignee: Airbus France, Toulouse (FR)

( * ) Notice: Subject to any disclaimer, the term of this patent is extended or adjusted under 35 U.S.C. 154(b) by 35 days.

(21) Appl. No.: 10/441,191

(22) Filed: May 20, 2003

(65) Prior Publication Data

US 2004/0000619 A1 Jan. 1, 2004

(30) Foreign Application Priority Data

Jun. 27, 2002 (FR) ............................................. 02 08011

(51) Int. Cl.⁷ ................................................. B64C 9/00
(52) U.S. Cl. ....................................... 244/201; 244/199
(58) Field of Search ......................... 244/201, 91, 199, 244/194, 195, 76 R

(56) References Cited

U.S. PATENT DOCUMENTS

| | | | | |
|---|---|---|---|---|
| 4,247,062 A | * | 1/1981 | Brueckner | |
| 4,457,479 A | | 7/1984 | Daude | |
| 4,538,779 A | * | 9/1985 | Goldstein | |
| 4,714,215 A | * | 12/1987 | Jupp et al. | |
| 4,722,499 A | * | 2/1988 | Klug | |
| 4,776,542 A | * | 10/1988 | Van Dam | |
| 5,070,458 A | * | 12/1991 | Gilmore et al. | |
| 5,072,894 A | * | 12/1991 | Cichy | |
| 5,275,358 A | * | 1/1994 | Goldhammer et al. | |
| 5,348,253 A | * | 9/1994 | Gratzer | |
| 5,478,031 A | * | 12/1995 | Piche | |
| 5,984,240 A | * | 11/1999 | Shinagawa | |
| 5,988,563 A | * | 11/1999 | Allen | |
| 6,345,790 B1 | * | 2/2002 | Brix | |
| 6,367,741 B2 | * | 4/2002 | Mezan | 244/195 |
| 6,484,968 B2 | * | 11/2002 | Felker | 244/91 |

* cited by examiner

*Primary Examiner*—Tien Dinh
(74) *Attorney, Agent, or Firm*—Stevens, Davis, Miller & Mosher, LLP

(57) ABSTRACT

An aircraft with active control of the warping of its wings may include at the outer end of each wing an articulating additional aerodynamic plane that is swept back with respect to the wing. The pivoting of the additional aerodynamic plane is controlled in such a way that, at certain flight points of the aircraft, the aerodynamic forces engendered by the additional aerodynamic plane modify the reference warp of the wing into an aerodynamically optimal warp for the relevant flight point.

10 Claims, 5 Drawing Sheets

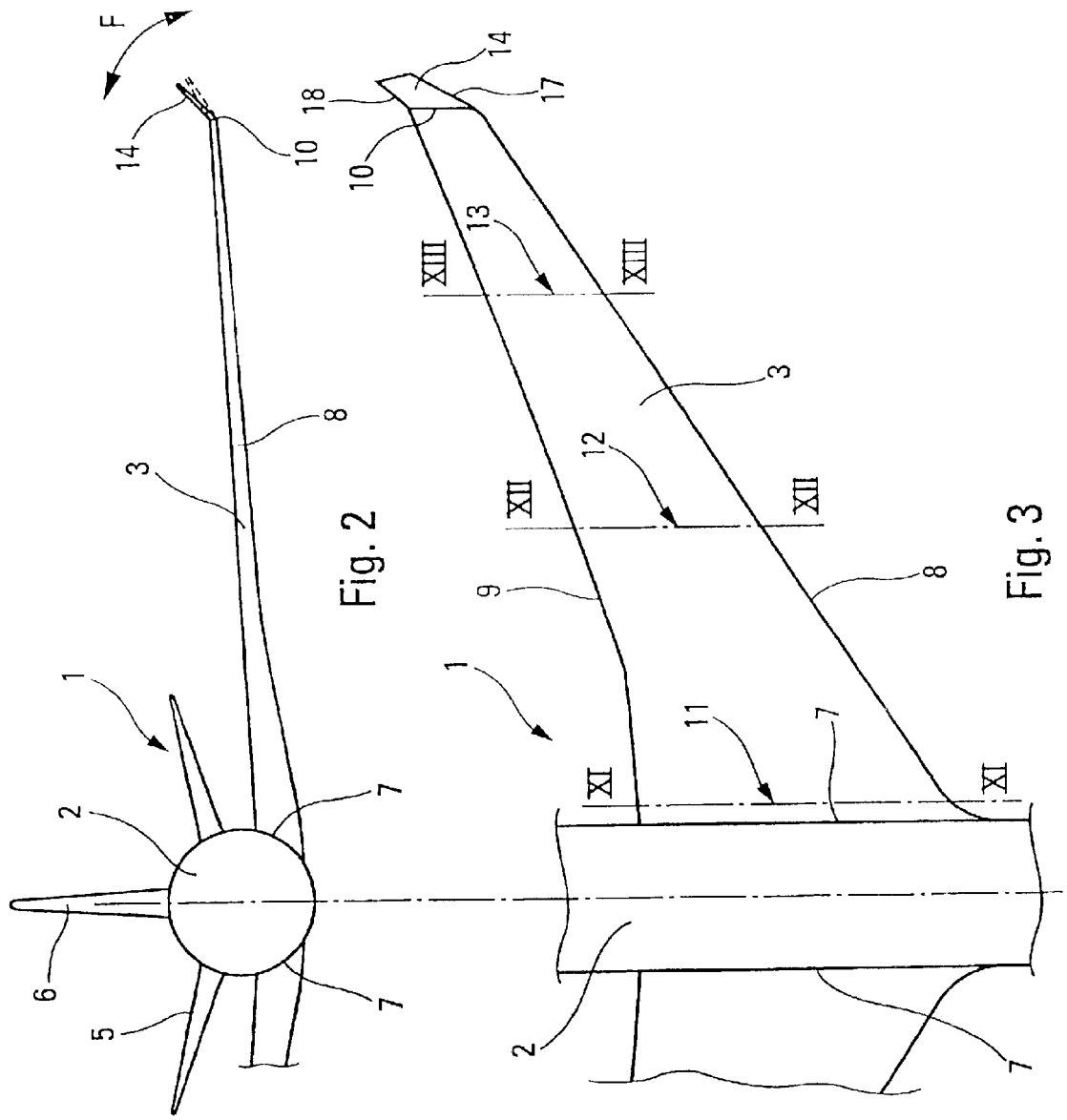

AIRCRAFT WITH ACTIVE CONTROL OF THE WARPING OF ITS WINGS

The present invention relates to the warping of the wings of aircraft and, in particular, the control of this warping in flight.

It is known that each of the wings of an aircraft consists of a plurality of elementary aerodynamic profiles, respectively set angularly with respect to a reference axis so as to impart a reference warp to said wing. Such a reference warp is determined theoretically in such a way as to optimize the performance of said wing, especially as regards the distributing of the span-wise aerodynamic loads and the reducing of the induced drag, at a very precise flight point, generally chosen to correspond to the middle of the cruising of the aircraft.

This known technique for producing aircraft wings with reference warp exhibits numerous drawbacks:

1. Firstly, since this reference warp is optimized for a particular cruising flight point, it follows conversely that it cannot be optimal for the other flight points and that, the further one moves away from the characteristics of this particular flight point, the worse is the performance of the wing and the higher is the drag.

2. An aircraft wing is a flexible structure which deforms under the action of the outside forces (aerodynamic forces, inertial forces, engine thrusts, etc) which are applied to it. As a result, the aircraft wing undergoes, in flight, flexions and torsions which directly influence its warp, so that, even at said particular flight point, the reference warp, which is specially associated therewith, may not be complied with. At the other flight points, these spurious flexions and torsions, induced by the flexibility of the aircraft, render the reference warp still less appropriate.

3. In flight, the wing undergoes thermal environmental stresses, with global deformation effects (bulk dilatation) and differential deformation effects between the lower face and the upper face, in the manner of a bimetallic strip. Here again, this results in flexions and torsions which influence the warp of the wing.

4. During the construction of the wing, the latter obviously does not find itself under the conditions prevailing at said particular flight point. Accordingly, one is obliged to determine by computation a construction warp, which will theoretically be able to confer said reference warp on said wing, at said particular flight point. However, regardless of the accuracy of the computation of the construction warp and the accuracy of production of the wing construction jigs, it is almost impossible to guarantee that the wing produced with said construction warp will take exactly the (theoretically desired) reference warp when said wing is at the particular flight point. Moreover, the residual deformations appearing on release of the assembly stresses and the tolerances of manufacture of the wing and of assembly of the wing to the fuselage of the aircraft further increase the difficulty of achieving the reference warp exactly.

From the foregoing it will be readily understood that the current technique does not make it possible to optimize the warp of an aircraft wing as a function of the latter's flight conditions and, consequently, does not make it possible to achieve the optimal aerodynamic performance.

The object of the present invention is to remedy this drawback.

To this end, according to the invention, the process for imparting the aerodynamically optimal warp to an aircraft wing at a flight point of said aircraft is noteworthy in that:

at the outer free end of said wing is articulated at least one additional aerodynamic plane, whose leading edge is swept back with respect to the leading edge of said wing; and at said flight point, said additional aerodynamic plane is given an angular position for which said additional aerodynamic plane engenders aerodynamic forces exerting a torsion on said wing and bringing the latter to said aerodynamically optimal warp.

The present invention is based on the fact that the sweep of said additional aerodynamic plane being greater than that of the airfoil results in a retreating of the center of pressure of this plane. Accordingly, the aerodynamic forces engendered by it, namely essentially a lift and a drag, exert a moment on said outer free end of the wing, by way of the articulation connecting it to said plane. The effect of such a moment is a torsion of the wing which influences the latter's warp. Furthermore, to each angular position of the additional aerodynamic plane there corresponds an orientation and a position of said aerodynamic forces, that is to say a value of said moment exerted on the end of the wing and hence an amplitude of the torsion exerted on the wing. Thus, with each angular position of said plane is associated, for a particular flight point, a specific warp of said wing.

Hence, in accordance with the present invention, an aircraft, each of whose wings consists of a plurality of elementary aerodynamic profiles distributed along its span and respectively set angularly with respect to a reference axis of said aircraft so as to impart a reference warp to said wing, said aircraft comprising, for each wing:

at least one additional aerodynamic plane, articulated at the outer free end of said wing, along a line of articulation; and actuation means able to pivot said additional aerodynamic plane about said line of articulation, is noteworthy in that:

the leading edge of each additional aerodynamic plane is swept back with respect to the leading edge of the corresponding wing; and control means are provided which, for at least certain flight points of said aircraft, address a pivoting order to said actuation means so that the latter give said corresponding additional aerodynamic plane a pivoted position, for which said additional aerodynamic plane engenders aerodynamic forces able to modify the current warp of said wing, resulting from said reference warp, into an aerodynamically optimal warp for the relevant flight point.

Thus, by virtue of the present invention, said additional aerodynamic plane located at the end of the wing engenders, when it is deflected, aerodynamic forces and moments acting on the warp of the wing. One therefore obtains slowly variable active control of the warp of the wing, thereby making it possible:

to optimize the performance of the aircraft, not only throughout cruising, but also in any phase of flight in which it is beneficial to improve the warp of the wings;

to increase the lift, in particular at low speeds;

to resolve, through slight asymmetries of deflection in respect of the additional aerodynamic planes of two opposite wings, the inevitable problems of asymmetry of the aircraft; and to correct, through a suitable corrective deflection, the inaccuracies of construction and of assembly of said wing.

It is observed:

that, in order to obtain this active control of the warp of a wing, it would be possible to use the moving surfaces (ailerons, slats, flaps, etc) usually provided on a wing. However, this would result in an unacceptable increase in drag; and that, for example through German patent DE-A-2 149 956 filed on 7 Oct. 1971, provision has already been made to articulate at least one additional aerodynamic plane at the end of the wing of an aircraft. However, in this known technique, an additional aerodynamic plane such as this is used only to reduce the drag induced by the wing tip vortices. In any case, the additional aerodynamic plane device would not be usable for the implementation of the present invention, owing to the fact that the leading edge of said plane is directly in line with that of the leading edge of the wing and is not swept back.

Furthermore, it is also advantageous for the trailing edge of each additional aerodynamic plane to be swept back with respect to the trailing edge of the corresponding wing.

Preferably, said line of articulation of the additional aerodynamic plane of the invention is at least substantially parallel to the longitudinal axis of the aircraft.

Advantageously, said additional aerodynamic plane can occupy a position of deployment for which it lies directly in line with the upper face of said wing.

Thus, at low speeds of the aircraft, said additional aerodynamic plane can provide an extra lifting surface.

When, in a known manner, the aircraft comprises at the wing tip a system of winglets (usually referred to thus in the aerodynamic art) for reducing the vortices at the end of the wing, it is advantageous for said additional aerodynamic plane to consist of one of the planes of said system of winglets. Thus, said plane can be used for an extra function, without thereby penalizing the aircraft aerodynamically.

Said control means can comprise a table, compiled by computation or experimentally, able to deliver a signal representative of an optimal—as regards the warp of the wing—angle of pivoting of said additional aerodynamic plane as a function of a plurality of flight parameters influencing said warp. Among these parameters mention may be made of:

the Mach number, since the aerodynamic loadings and their distribution depend on the Mach number;

the speed since, at constant altitude, the more the speed increases, the more the dynamic pressure increases and the bigger is the dewarping;

the altitude, since the more the altitude increases, the more the dynamic pressure decreases at constant speed and the smaller will be the dewarping;

the position of the center of gravity of the aircraft: specifically, the position of this center of gravity imposes a distribution of the lift between the wings of the aircraft and the latter's horizontal tailplane. The variation in the position of the center of gravity of the aircraft while cruising, due to the consumption of fuel, therefore imposes a variation in the distribution of the lift between the wings and said horizontal tailplane;

the weight of the aircraft and its distribution, since the bigger the weight of the aircraft, the larger will be the lifting force required to keep the aircraft aloft, and hence the flexion of the wing and the dewarping of the latter. Furthermore, the weight of fuel stored in the wing tanks tends to counteract the upward flexion of the wings and therefore tends to reduce the dewarping of the wings;

the temperature outside and inside the wing;

the temperature at the upper face and at the lower face of the wing;

the output of the engines, that is to say the thrust which they exert.

In this case, at least one sensor for each of said parameters is provided on board the aircraft and the measurements of said sensors are addressed to said table, which then delivers a first signal representative of the optimal angle of pivoting. This signal is addressed to said means of actuation, which actuate said additional aerodynamic plane accordingly.

In a variant embodiment:

said control means furthermore comprise a second table able to deliver a second signal representative of the optimal—as regards the warp of said wing—angle of setting of a particular elementary aerodynamic profile of said wing, as a function of said plurality of flight parameters mentioned hereinabove;

there is provided, on board said aircraft, in addition to said sensors connected to the inputs of said second table, at least one measuring device delivering a third signal representative of the current value of said angle of setting of said particular elementary aerodynamic profile, and means for comparing said second and third signals; and said actuation means receive, by way of pivoting order, the sum of said first signal and of a signal representative of the comparison between said second and third signals.

One thus obtains continuous feedback control of the warping of said wing, said particular elementary aerodynamic profile preferably being located in the vicinity of the outer end of said wing. This mode of embodiment is based on the fact that, said wing being built into the fuselage at its root, it is sufficient to impose an angle of setting on an elementary aerodynamic profile of said wing in order to vary the warping of all said elementary aerodynamic profiles.

The measuring device delivering said third signal can comprise, for example, an accelerometer placed at said particular elementary aerodynamic profile, whose measurements are compared with those of another accelerometer placed in the fuselage of the aircraft, thereby making it possible to obtain the warping of said particular elementary aerodynamic profile.

In the case where continuous instantaneous feedback control is not indispensable, it is possible to take the average, over a predetermined duration, of said first, second and third signals. One then obtains discontinuous feedback control.

Preferably, between said means of comparison and said actuation means, said signal representative of the comparison is multiplied by a gain, whether or not said second and third signals are averaged. Such a gain is specific to each aircraft and it signifies, if its value is equal to K, that said additional aerodynamic plane must be deflected by K degrees to obtain a warping of degree of said particular elementary aerodynamic profile of the wing, generally at the free end of the latter.

Regardless of the embodiment of said control means, it is indispensable for the pivoting order transmitted to the additional aerodynamic plane to be strongly filtered so that the movements of the latter are slow and independent of the disturbances of the atmosphere and of the moments of the aircraft. The filtering frequency must be less than the natural frequencies of the wing. For example, for a civil wide-bodied aircraft whose natural frequencies are of the order of 1 hertz, the filtering frequency will be much less than a tenth of a hertz.

The figures of the appended drawing will elucidate the manner in which the invention may be embodied. In these figures, identical references designate similar elements.

FIG. 2 is a partial diagrammatic view of this aircraft, viewed from the front.

FIG. 3 is a partial diagrammatic view of this aircraft, viewed from above.

Figure 1:
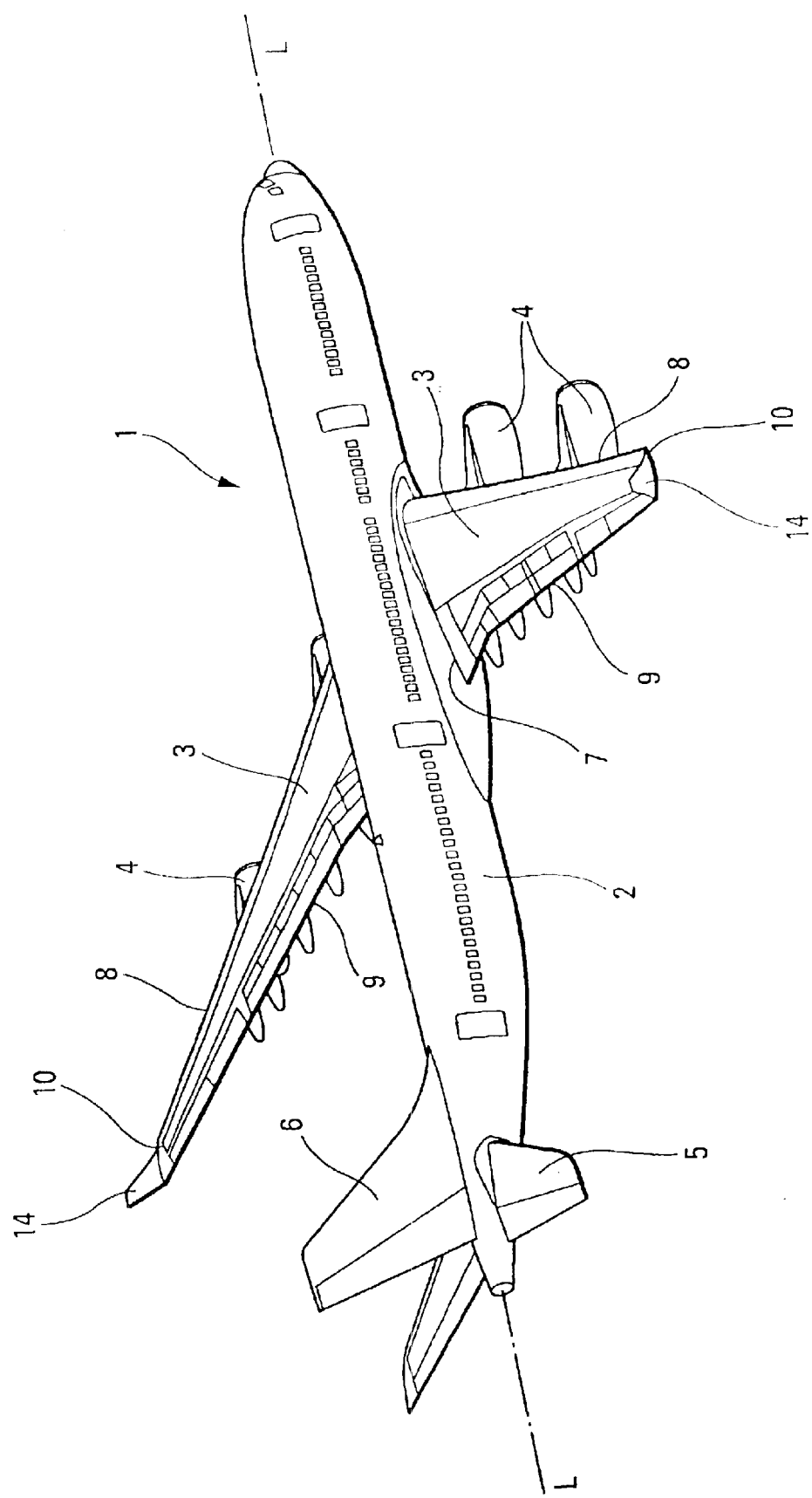
FIG. 1 is a perspective view, from the front and from above, of a commercial aircraft in accordance with the present invention, during flight.
Figure 4:
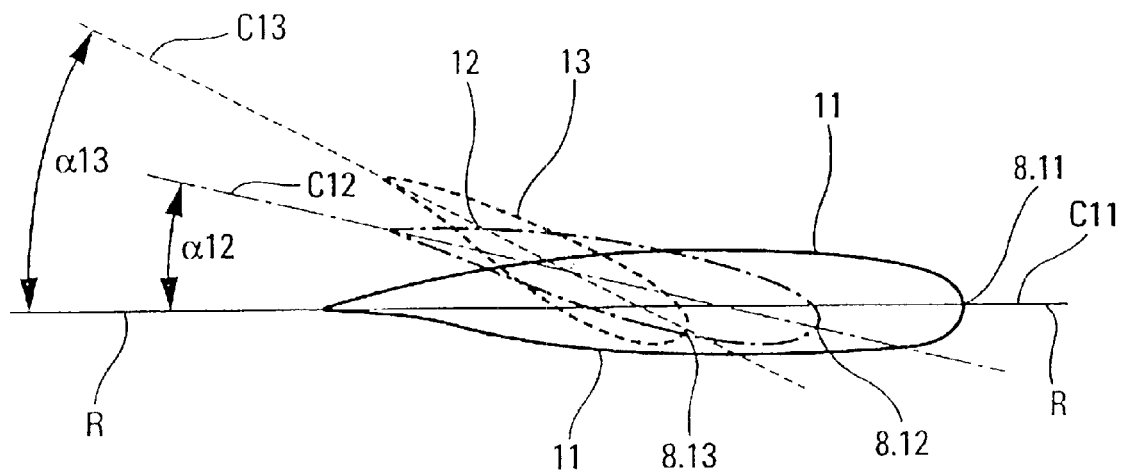

FIG. 4 diagrammatically illustrates the warping of the wings of the aircraft of FIGS. 1 to 3.

Figure 5:
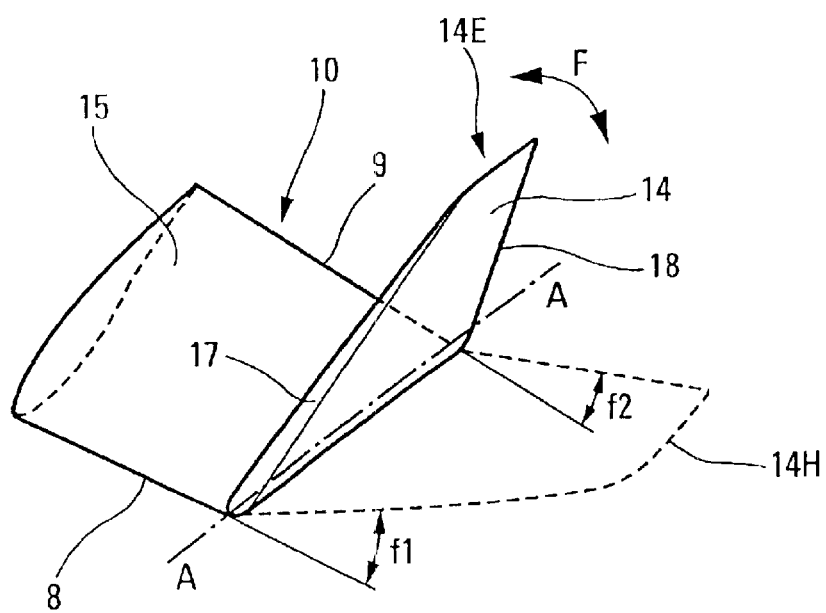

FIG. 5 shows, in diagrammatic perspective and on a larger scale, the winglet provided at the free outer end of each of the wings of the aircraft of FIGS. 1 to 3.

Figure 6:
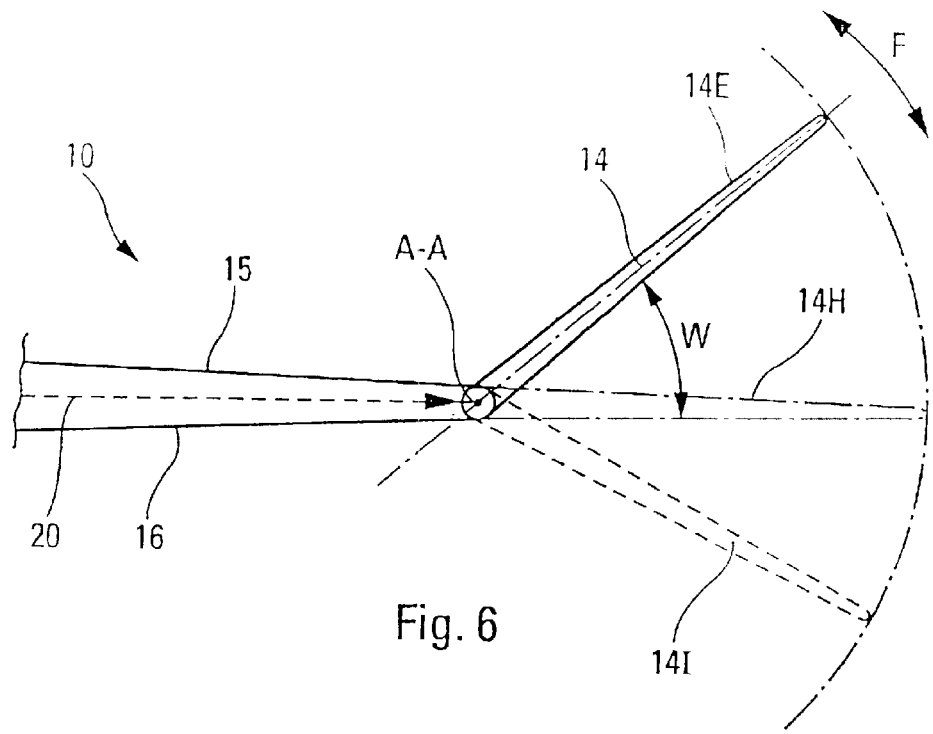

FIG. 6 is a diagrammatic front-on view of FIG. 5.

Figure 8:
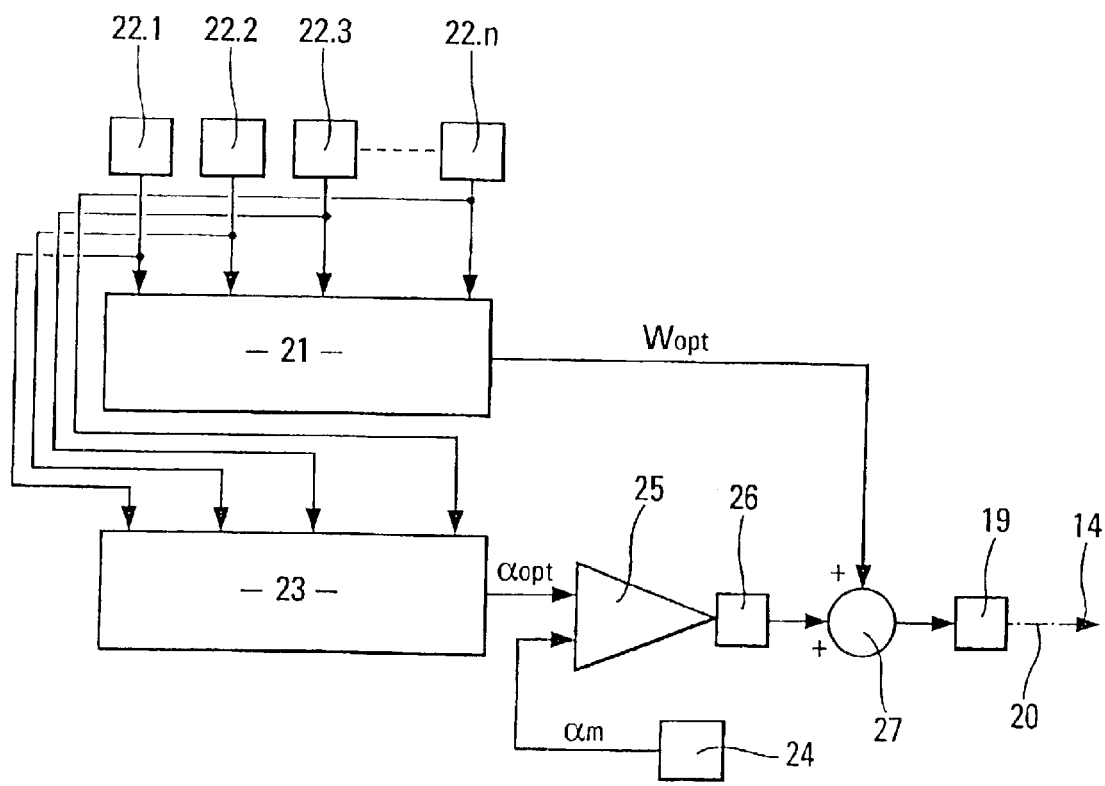
Figure 7:
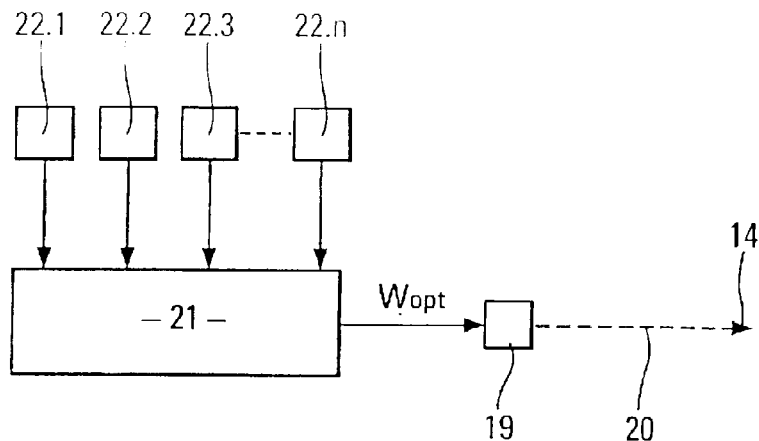
Figure 9:
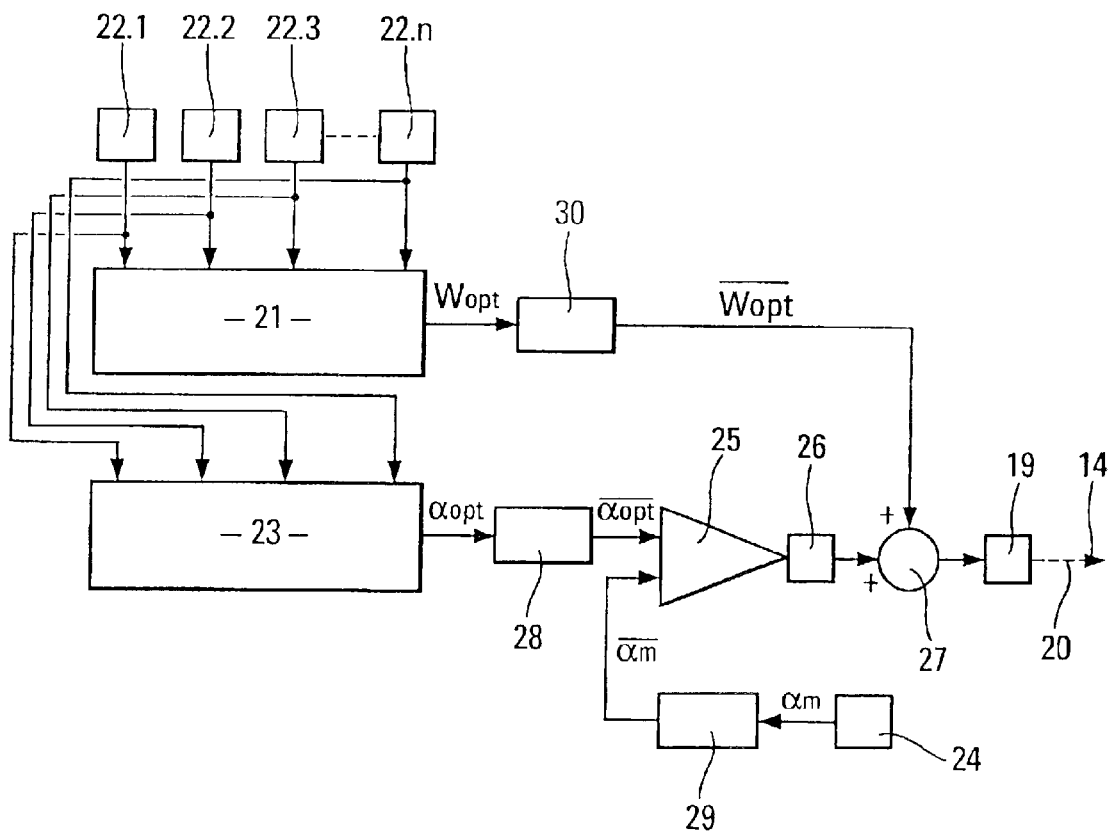

FIGS. 7, 8 and 9 are the schematic diagrams of three embodiments of the means of rotational control of the winglet of FIGS. 5 and 6.

The wide-bodied commercial aircraft 1, in accordance with the present invention and shown diagrammatically in perspective in FIG. 1, comprises an elongate fuselage 2 with longitudinal axis L—L, two wings 3 symmetrically opposite with respect to said fuselage 2, engines 4 suspended from said wings 3, a horizontal tailplane 5 and a vertical fin 6. The two wings 3 are rooted in said fuselage 2 at 7. Each of them forms a leading edge 8 toward the nose and a trailing edge 9 toward the tail. Moreover, they are swept back with respect to the fuselage 2 and their width decreases from their root 7 to their outer end 10.

In a known manner, each of the two wings 3 consists of a plurality of elementary profiles angularly set with respect to a reference axis R—R and extending along the span of the corresponding wing 3, in such a way as to impart a reference warp to said wings 3. This warp may be characterized by the angle of setting $\alpha$ made by the chord of the current elementary profile with the chord of a base elementary profile, such as is illustrated diagrammatically in FIG. 4.

In this FIG. 4, only three elementary profiles such as these have been represented. The first of them, which bears the reference 11, serves as zero reference for the warping and corresponds, for example, to the elementary profile of said wing 3 at the level of the root 7 (see the line XI—XI of FIG. 3). Its chord, which forms the reference axis R—R, and its leading edge are respectively designated by the references C11 and 8.11. The second elementary profile, represented in FIG. 4 and bearing the reference 12, is smaller than the elementary profile 11 and is situated in an intermediate position of the corresponding wing, at the location of the line XII—XII of FIG. 3. Its leading edge bears the reference 8.12 and, with respect to the chord C11 of the elementary profile 11, the chord C12 of the elementary profile 12 is inclined by the value $\alpha 12$ of the angle of setting $\alpha$. The third elementary profile 13, whose leading edge bears the reference 8.13, is situated in the vicinity of the outer end 10 of the corresponding wing 3, at the location of the line XIII—XIII of FIG. 3 and it is smaller than the elementary profile 12. With respect to the chord C11 of the elementary profile 11, the chord C13 of the elementary profile 13 is inclined by the value $\alpha 13$ of the angle of setting $\alpha$, larger than the value $\alpha 12$.

Thus, each of the wings 3 is warped, from its root (profile 11) to its outer end 10, and the further away the elementary profile is from said root 7, the more its leading edge is oriented downward.

Additionally, at the outer end 10 of each of the wings 3 is provided a winglet 14, generally designated thus in the aeronautical art and intended, in a known manner, to reduce the drag induced by the wing tip vortices.

As is represented in FIGS. 5 and 6, the winglet 14 is articulated, at the outer end 10 of a wing 3, along a line of articulation A—A, at least substantially parallel to the longitudinal axis L—L of the fuselage 2, so as to be able to take pivoted positions 14E directed to the upper face 15 side of the wing 3 and, possibly, a position 14H directly in line with the wing 3 or pivoted positions 14I directed to the lower face 16 side of said wing.

Additionally, as is illustrated in FIG. 5, the leading edge 17 of the winglet 14 is swept back with respect to the leading edge 8 of the wing 3, the angle of sweep being designated by f1. Likewise, the trailing edge 18 of the winglet 14 is swept back with respect to the trailing edge 9 of the wing 3, the angle of sweep being designated by f2. Therefore, as explained hereinabove, at a particular flight point, the center of pressure of the winglet 14 retreats, so that the latter exerts a moment on the end 10 of the wing, through the articulation A—A. Moreover, this moment is dependent on the value of the angle W that said winglet 14 makes with the wing 3.

Also, actuation means 19, for example of the jack type, are connected to the winglet 14, for example by a linkage 20 (see FIGS. 6 to 9), so as to be able to rotate it about said line of articulation A—A and thus vary said angle W, as is illustrated by the double arrow F.

Represented in FIG. 7 is a first exemplary embodiment of means able to control the means of actuation 19, 20. These means of control essentially comprise a table 21, established by computation or experimentally, giving an optimal value Wopt of said angle W as a function of a plurality of flight parameters, such as those mentioned hereinabove, namely: Mach number, altitude, position of the center of gravity, weight, distribution of the weights, temperatures, engine outputs. The aircraft 1 furthermore comprises a plurality of sensors 22.1 to 22.n measuring the current value of each of the parameters used in the table 21, the measurements of said sensors being addressed to said table. Thus, at each instant, the table 21 delivers an optimal value Wopt, corresponding to the current flight point and to the configuration of the aircraft (weight, distribution of weights, etc). This optimal value Wopt is addressed to the actuation means 19, 20, which compel the winglet 14 to take a position pivoted by said angle Wopt. One thus obtains open-loop feedback control of the position of the winglet 14, and hence of the warping of the wing 3, as a function of the current flight point of the aircraft 1.

The table 21, the actuation means 19, 20 and the sensors 22.1 to 22.n described hereinabove are found again in the device illustrated by FIG. 8. In this device, with the table 21 is associated another table 23 able to deliver a signal $\alpha$opt representative of the optimal—as regards the warping of the wing 3—value of the angle of setting $\alpha$ of a particular elementary aerodynamic profile, for example that bearing the reference 13 in FIGS. 3 and 4, as a function of the plurality of flight parameters measured by the sensors 22.1 to 22.n. Moreover, this device comprises a device 24 (for example of the type mentioned hereinabove) able to deliver a signal representative of the current value $\alpha$m of said angle of setting of this particular elementary aerodynamic profile. Means of comparison 25 compare the signals $\alpha$opt and $\alpha$m and the result of the comparison is multiplied by a gain K, specific to the aircraft 1, in an amplifier 26, after which it is added at 27 to the signal Wopt originating from the table 21. The sum of signals appearing at the output of the adder 27 is thereafter addressed to the actuation means 19, 20 for the control of the additional plane 14.

The device of FIG. 9 is similar to that of FIG. 8, except that means 28, 29 and 30 for averaging the signals $\alpha$opt, $\alpha$m and Wopt are disposed respectively at the inputs of the means of comparison 25 and at the output of the table 21. Thus, it is the signals $\alpha$opt, $\alpha$m and Wopt, corresponding respectively to the average of the signals $\alpha$opt, $\alpha$m and Wopt over one and the same duration, which are used to actuate the pivoting of the additional aerodynamic plane 14.

What is claimed is:

1. A process for imparting aerodynamically optimal warp to an aircraft wing at a flight point of said aircraft, the process comprising:

articulating, at the outer free end of said wing about a line of articulation that is at least substantially parallel to the longitudinal axis of said aircraft, at least one additional aerodynamic plane whose leading edge is swept back with respect to the leading edge of said wing; and giving, at said flight point, said additional aerodynamic plane an angular position for which said additional aerodynamic plane engenders aerodynamic forces that exert a torsion on said wing and bring the wing to said aerodynamically optimal warp.

2. An aircraft, comprising a plurality of wings each wing including a plurality of elementary aerodynamic profiles distributed along its wing span and respectively set angularly with respect to a reference axis of said aircraft so as to impart a reference warp to said wing, said aircraft comprising, for each wing:

at least one additional aerodynamic plane, articulated at the outer free end, of said wing, along a line of articulation at least substantially parallel to the longitudinal axis of said aircraft; and actuation means able to pivot said additional aerodynamic plane about said line of articulation, wherein;

the leading edge of each additional aerodynamic plane is swept back with respect to the leading edge of the corresponding wing; and control means are provided which, for at least certain flight points of said aircraft, address a pivoting order to each of said actuation means so that the respective actuation means give said corresponding additional aerodynamic plane a pivoted position, for which said additional aerodynamic plane engenders aerodynamic forces able to modify the current warp of the corresponding wing, resulting from said reference warp, into an aerodynamically optimal warp for the relevant flight point.

3. The aircraft as claimed in claim 2, wherein the trailing edge of each additional aerodynamic plane is swept back with respect to the trailing edge of the corresponding wing.

4. The aircraft as claimed in claim 2, wherein each of said additional aerodynamic planes can occupy a position of deployment for which said additional aerodynamic plane lies directly in line with the upper face of said wing.

5. The aircraft as claimed in claim 2, wherein each of said additional aerodynamic planes forms part of a system of winglets, which is designed to reduce the vortices at the corresponding wing tip.

6. The aircraft as claimed in claim 2, wherein:

said control means comprise a first table that delivers for each of said additional aerodynamic planes a first signal representative of an optimal—as regards said warp of the corresponding wing—angle of pivoting of said additional aerodynamic plane as a function of a plurality of flight parameters influencing the warp of said corresponding wing;

at least one sensor for each of said parameters is provided on board said aircraft, said sensors being connected to the inputs of said first table; and each of said actuation means receives, by way of said pivoting order, said respective first signal representative of said optimal angle of pivoting delivered by said control means.

7. The aircraft as claimed in claim 6, wherein:

said control means furthermore comprise a second table that delivers for each of said additional aerodynamic planes a second signal representative of the optimal—as regards the warp of said corresponding wing—angle of setting of a particular elementary aerodynamic profile of said corresponding wing, as a function of said plurality of flight parameters influencing the warp of said wing, said sensors being connected to the inputs of said second table;

there is provided, on board said aircraft, a measuring device that delivers for each of said additional aerodynamic planes a third signal representative of the current value of said angle of setting of said corresponding particular elementary aerodynamic profile, and means for comparing said respective second and third signals; and each of said actuation means receives, by way of said pivoting order, the sum of said respective first signal and of a signal representative of the comparison between said respective second and third signals.

8. The aircraft as claimed in claim 7, wherein said control means comprise means of averaging for each of said actuation means said respective first, second and third signals, so that each of said actuation means receive, by way of said pivoting order, the sum of said respective first averaged signal and of a signal representing the comparison between said respective second and third averaged signals.

9. The aircraft as claimed in claim 7, wherein each of said particular elementary aerodynamic profiles lies in the vicinity of the free outer end of said corresponding wing.

10. The aircraft as claimed in claim 7, wherein for each of said actuations means, between said means of comparison and said actuation means, said corresponding signal representative of the comparison is multiplied by a gain, specific to said aircraft.

* * * * *